(No Model.)

T. J. KYTE.
SLED BRAKE.

No. 333,957.  Patented Jan. 5, 1886.

WITNESSES
F. L. Ourand
E. W. Johnson

Thomas J. Kyte
Attorney

UNITED STATES PATENT OFFICE.

THOMAS J. KYTE, OF DECKERTOWN, NEW JERSEY.

SLED-BRAKE.

SPECIFICATION forming part of Letters Patent No. 333,957, dated January 5, 1886.

Application filed October 22, 1885. Serial No. 180,646. (No model.)

*To all whom it may concern:*

Be it known that I, THOMAS J. KYTE, a citizen of the United States of America, residing at Deckertown, in the county of Sussex and State of New Jersey, have invented certain new and useful Improvements in Brakes for Sleds; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in brakes for sleighs, the object of the same being to provide a means whereby dogs will be thrown below the plane of the runners when the sled moves forward upon the tongue, said dogs being held normally above the plane of the runners by a longitudinal spring-bar, which is hinged to the rear portion of the tongue; and my invention consists in the construction and combination of the parts, as will be fully set forth, and specifically pointed out in the claims.

Figure 1:
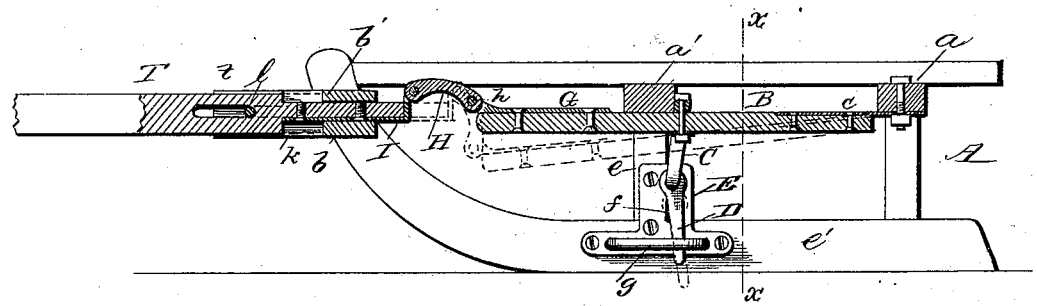
Figure 2:
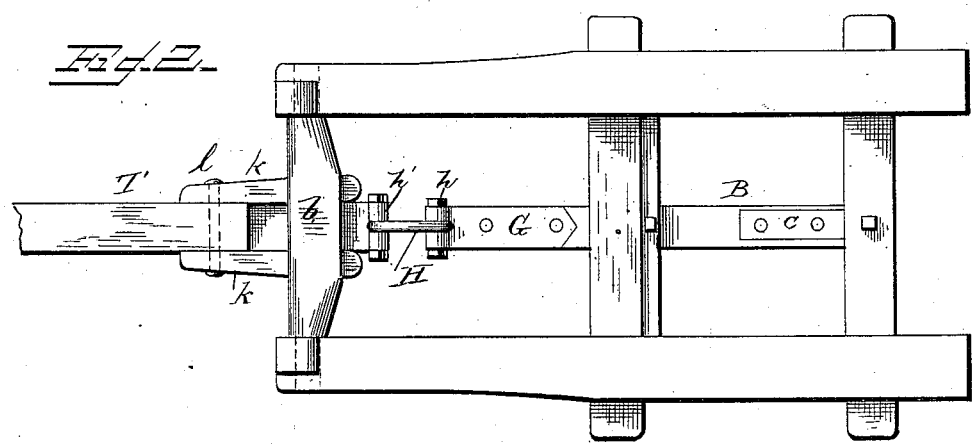
Figure 3:
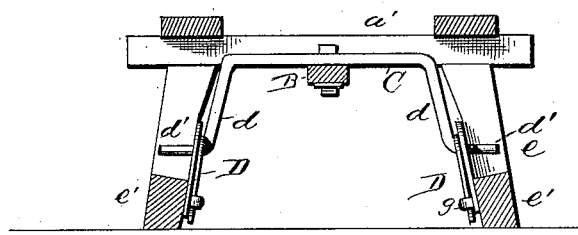

In the accompanying drawings, which illustrate my invention, Figure 1 is a longitudinal section of a sled with my improved brake attached thereto. Fig. 2 is a plan view, and Fig. 3 is a transverse section taken through the line $x\ x$ of Fig. 1.

A represents a sled of ordinary construction, which is provided with transverse beams $a\ a'$ and a pivoted cross-bar, $b$, which is attached to the forward end of the runners.

B represents a bar, which is provided at its rear end with a flat spring, $c$, which is attached thereto and to the under side of the cross-bar $a$ by a bolt or clip. Immediately to the rear of the cross-bar $a'$ of the sled, and upon the spring-bar B, is secured a bent rod, C, which extends transversely under the sled, and is provided with downwardly-projecting members $d\ d$, the ends of which are bent outwardly, as shown at $d'$, said ends carrying dogs D, which are provided with eyes which are passed over the ends of the bent bar $d$ and hang downwardly from the same.

E represents angle-plates, which are attached to the standards $e$ and to the runners $e'$. The upwardly-projecting portion of these angle-plates are provided with vertical slots $f$ through which the ends of the bar C pass, the dogs D resting upon the inner sides of the same. The lower or horizontal portions of the angle-plates E are attached to the runners $e'$, and are provided with horizontal loops or bails $g$, through which the ends of the dogs D pass, said dogs, when in a nearly vertical position, being adapted to abut against the rear shoulders of said loops or bails.

To the forward end of the bar B, and upon its upper edge, is attached a plate, G, the forward end of which is provided with perforated eyes, through which the bolt $h$ may be passed for pivotally attaching thereto curved link H, said curved link being also pivotally secured at its forward end to the eyes $h'$ of the plate I, said plate being attached to the end of the tongue T. The tongue T passes through a central opening, $b'$, in the pivoted cross-bar $b$, and adjacent to this opening are attached the upwardly-projecting hounds $k$, between which the tongue slides, and said tongue is secured to said hounds by a bolt, $l$, which passes through a longitudinal slot, $t$, in said tongue, the length of said slot being such that when the tongue is drawn forward the rear end of the slot will contact with the bolt $l$, and when the sled slides forward upon said tongue the bolt will contact with the opposite end, so that the tongue will move rearwardly with relation to the sled, so as to cause the bar B to be depressed, as shown in Fig. 1, thus causing the dogs D to be depressed below the plane of the runners, so as to contact with the ground, said dogs being held from swinging rearwardly upon the pivots by the rear portion of the bails $g$, while, if it should be desirable to back the sled, said dogs would swing forwardly and upwardly, so as to be above the plane of the runners. By connecting the rear end of the tongue and the bar B to each other by a curved link, H, it will be seen that the tongue and curved link cannot lie on a line with each other, thereby insuring positive action when the sled slides forward upon the tongue, and also that when the draft is upon the tongue said tongue and curved link will have a tendency to hold the bar B in an elevated position.

I claim—

1. In a brake for sleds, the combination of the bar B, attached to the frame by a spring and to a sliding tongue by a link, an angle-bar, C, having its lower ends bent outwardly and passing through vertical slots in a plate, E, and the pivoted dogs D, attached thereto, so as to play under the bails $g$ and contact with the rear portion of said bails, substantially as shown, and for the purpose set forth.

2. The combination, in a brake for sleds, of an angle-plate, E, having vertical slots $f$ and horizontal bails $g$, pivoted dogs D, and bent bar C, which is rigidly connected to a longitudinal spring-bar attached to the sled, substantially as shown, and for the purpose set forth.

3. In a brake for sleds, the spring-bar B, attached at its rear end to the sled-body and provided centrally with a bar having downwardly-projecting members with outwardly-bent ends, the angle-plates E, with vertical slots through which the horizontal ends of the bar C pass, bails $g$, formed on the angle-plates, and pivoted dogs D, and curved link connecting the forward end of the spring-bar B with the rear end of the tongue, said tongue having a rearward and forward movement with respect to the sled, the parts being combined and organized substantially as shown, and for the purpose set forth.

In testimony whereof I affix my signature in presence of two witnesses.

THOMAS J. KYTE.

Witnesses:
A. WATSON SLOCKBOWER,
JOHN M. COX.